Nov. 3, 1942. G. T. MEYERS 2,301,134
METHOD OF FEEDING MOLTEN GLASS
Filed Sept. 6, 1939 2 Sheets-Sheet 1

INVENTOR
George T. Meyers.
BY
ATTORNEYS

Nov. 3, 1942.   G. T. MEYERS   2,301,134
METHOD OF FEEDING MOLTEN GLASS
Filed Sept. 6, 1939   2 Sheets-Sheet 2

INVENTOR
George T. Meyers.
BY
Corbett & Mahoney
ATTORNEYS

Patented Nov. 3, 1942

2,301,134

UNITED STATES PATENT OFFICE 2,301,134

METHOD OF FEEDING MOLTEN GLASS

George T. Meyers, Parkersburg, W. Va., assignor to The Meyers Company, Parkersburg, W. Va., a corporation of West Virginia Application September 6, 1939, Serial No. 293,607

1 Claim. (Cl. 49—77)

My invention relates to method of feeding molten glass. It has to do, more particularly, with a method of feeding molten glass from the forehearth or spout of a glass melting furnace to a mold or the like for shaping into the desired article.

At the present time, it is customary to feed the molten glass from the spout by allowing it to flow under a gravity force or to actually force it through a downwardly opening discharge orifice in the spout. The issuance of the glass through the discharge orifice of the spout causes a stretching or pulling farther apart of the "fibers" or "molecules" of the glass longitudinally of the stream of glass issuing from the orifice. This especially occurs adjacent the surface of the stream of molten glass since the portion adjacent the surface cools to a greater extent, because of contact with the wall of the orifice, than the center portion of the stream of glass. This longitudinal stretching of the molecules or fibers of the glass produces certain strains in the finished article and results in increased percentage of breakage.

It is generally agreed by glass engineers that glassware while being packed or inspected at the end of the lehr loses a considerable percentage of its original strength. This is caused by rolling and rubbing of the finished articles together during inspecting and packing. The surfaces seize and are scratched, scored and pitted and this starts flaws in the glass which easily open up later under ordinary usage thereby causing breakage of the article. It has been suggested that the lehr be sulfur fumed so that a bloom forms upon the glass surface before the packer at the end of the lehr touches the finished article. However this method has been found to be very impractical. After this treatment, the finished product is greasy and the customers object to this bloom and greasy condition of the finished glassware.

One of the objects of my invention is to provide a method of feeding molten glass which is of such a nature that as the glass is fed from the spout, it is acted upon in such a manner that the fibers or molecules will be better distributed and arranged so that the elasticity of the glass will be increased and certain strains and tensile stresses in the finished product will be eliminated.

Another object of my invention is to provide a method of the type indicated of such a nature that a lubricating and protecting film will be applied to the gob of glass before it enters the mold, which will facilitate entrance of the glass into the mold and will protect the surfaces of the finished article during inspection and packing thereof.

In its preferred form my invention contemplates the provision of a glass feeder embodying a spout and means for controlling the flow of glass through the discharge orifice thereof which are of substantially the same structure as those disclosed in my Patent No. 2,079,519, issued May 4, 1937. However, directly below the discharge orifice of the spout I provide a rotatable annular member which I may term a "bushing." This rotatable bushing is rotated by suitable means at a predetermined rate of speed. It is of a diameter slightly less than that of the discharge orifice of the spout so that as the stream of molten glass issues from the spout orifice it will contact with the wall of the bushing. It will be partially supported by the bushing and after it is sheared, it will gradually settle through the bushing and fall from the lower end thereof. However, during the time it is in contact with the wall of the bushing, the surface thereof is so acted upon by the rotating bushing that the glass fibers or molecules are compounded, meshed, matted and distributed diametrically horizontally and vertically. This better distribution and better arrangement of the fibers or molecules results in the elimination of certain defects in the finished article made from the gob.

Also, in association with the rotating bushing I provide means for providing a lubricating and protecting film to the outer surface of the glass. This film may be applied to the glass both before and after its passage through the rotating bushing. This film is preferably a carbonaceous film. It will facilitate entrance of the gob into the mold since it will condition the outer surfaces of the glass so seizing and scoring of the surfaces will be eliminated. Furthermore, it will protect the surfaces while the finished article is being inspected and packed.

The preferred embodiment of my invention is illustrated in the accompanying drawings wherein similar characters of reference designate corresponding parts and wherein.

Figure 1:
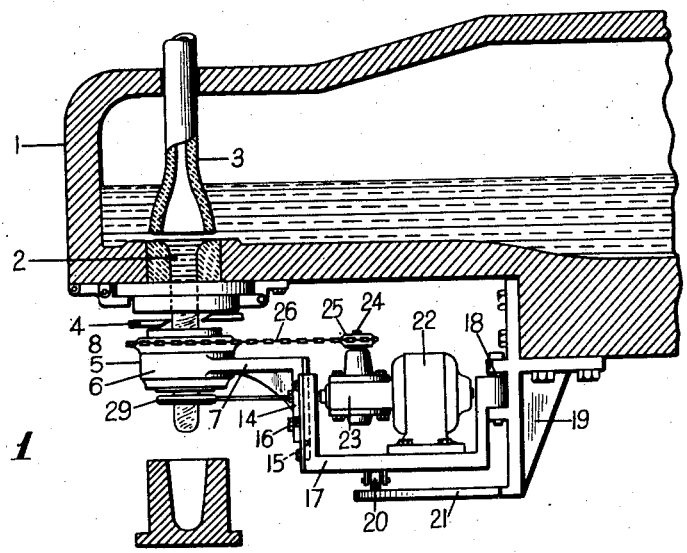
Figure 1 is a view partly in vertical section and partly in side elevation illustrating the apparatus which I preferably provide.
Figure 2:
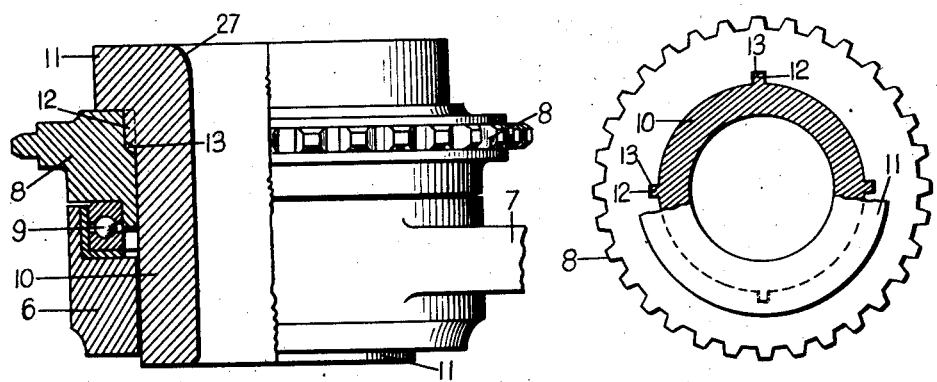
Figure 2 is a view partly in side elevation and partly in vertical section of the rotatable bushing structure which I provide.
Figure 3:
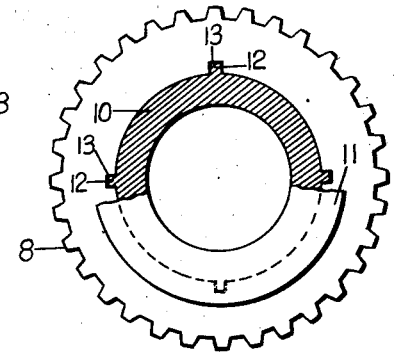
Figure 3 is a top plan view, partly broken away, of the structure illustrated in Figure 2.
Figure 4:
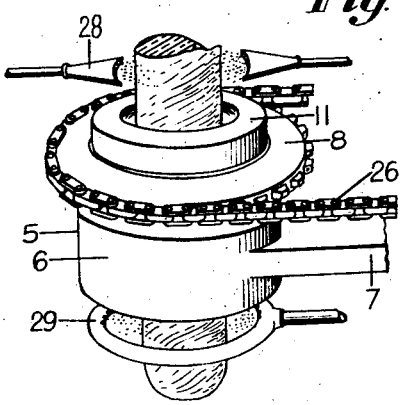
Figure 4 is a view in perspective of the rotatable bushing structure showing the glass passing therethrough and also illustrating means for applying the lubricating and protecting film thereto.

With reference to the drawings, in Figure 1 I have illustrated a spout 1 which may be the same as that disclosed in my Patent No. 2,079,519, issued May 4, 1937. This spout is provided with a discharge orifice 2. Vacuum operated controlling means 3 may be provided for controlling the flow of glass through the discharge orifice as described in my patent. A plunger or any other suitable means may be employed for controlling the flow of glass. Directly below the discharge orifice suitable shears 4 may be provided for shearing charges or gobs of proper size from the stream of molten glass issuing through the orifice.

Directly below the discharge orifice of the spout I provide a rotatable bushing structure which I shall indicate generally by the numeral 5. This rotatable bushing structure comprises a supporting ring 6 which is carried on the outer end of an arm 7. This ring rotatably supports a ring-shaped sprocket 8. A ballbearing 9 is provided between the members 6 and 8 to facilitate rotation of the member 8 on the member 6. Within the members 6 and 8 is disposed the bushing proper indicated by the numeral 10. This bushing may be made of any suitable material but is preferably made of stainless steel or other suitable material for contacting with the hot glass and properly acting thereon. This bushing 10 is provided with a peripheral flange 11 which will rest on the top edge of the sprocket 8 so that it will be supported for rotation therewith. The bushing will rotate relative to the ring 6. The bushing 10 is provided with vertically disposed lugs 12 on its outer surface directly below the flange 11. These lugs 12 fit into corresponding openings 13 formed in the inner surface of the sprocket 8. The cooperating lugs 12 and openings 13 serve to lock the members 11 and 8 together so that they will rotate together. However, it will be noted that the bushing 11 may be easily and quickly removed merely by lifting it upwardly. Thus, the bushing may be readily replaced with a bushing having an opening of a different size. The size of the opening in the bushing will depend on the size of the opening in the discharge orifice of the spout and is preferably slightly smaller.

The supporting arm 7 for the bushing has a vertically disposed guide portion 14 on its outer end which fits into a vertically disposed slideway 15. This arrangement will permit vertical adjustment of the bushing structure to properly position it relative to the discharge orifice of the spout. The members 14 and 15 will be held in proper position relative to each other by means of bolts 16. The member 15 is carried by a horizontally disposed supporting arm 17. This arm 17 is pivoted for swinging movement in the horizontal plane at 18 to a support 19 secured to the lower portion of the spout 1. The arm 17 carries a roller 20 on its lower side which rests on a horizontally disposed plate 21 formed as a part of the member 19. With this arrangement the bushing structure may be swung away from beneath the discharge orifice of the spout and back again into position with ease. The arm 17 supports an electric motor 22 which is preferably of the reversible type. This motor 22 drives speed reduction gearing 23 which, in turn, drives a vertical shaft 24. The shaft 24 has keyed on its upper end a sprocket 25. This sprocket 25 drives a chain 26 which also passes around the sprocket 8 of the rotatable bushing structure. Thus, the motor 22 will rotate the bushing 11. Suitable controls are preferably provided for the motor so that it may be reversed to reverse the direction of the rotation of the bushing and also for changing the speed of rotation of the bushing.

Figures 7, 8:
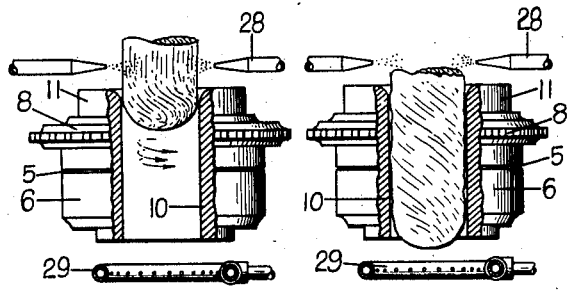
Figure 7 is a view of the rotatable bushing structure shown in Figure 2 illustrating how the glass enters the structure.
Figure 8 is a similar view showing how the glass passes through and is acted upon by the bushing structure.
Figure 9:
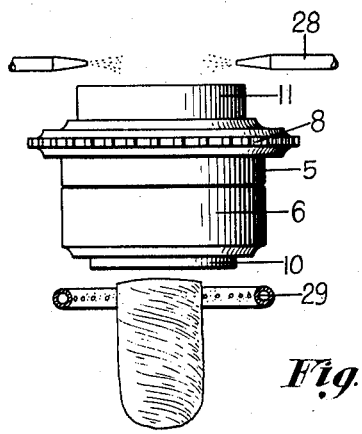
Figure 9 is a view of the bushing structure showing the glass gob after it drops therefrom.

In the use of this bushing structure, a bushing of proper size is positioned in the sprocket 8 and it is rotated at a predetermined rate of speed. As the glass flows from the discharge orifice of the spout, the lower end of the stream will enter the upper end of the bushing, as indicated in Figure 7. The upper end of the bushing is flared, as indicated at 27 to facilitate entrance of the glass thereinto. Since the opening in the bushing will be slightly less in diameter than that of the stream of molten glass, the glass will contact with the wall of the bushing and will be partially supported thereby. It will gradually settle through the bushing as indicated in Figure 8, and after it is sheared will fall from the bushing as indicated in Figure 9. The shearing may take place either before or after the glass reaches the position indicated in Figure 8. During the time the glass is in contact with the wall of the bushing, the surface thereof is so acted upon by the rotating bushing that the glass fibers or molecules are compounded, meshed matted and distributed diametrically, horizontally and vertically. This will increase the elasticity of the glass in the finished article and will eliminate certain strains and tensile stresses in the finished article which will tend to produce breakage. The bushing is preferably rotated at such a rate of speed that the entire stream of glass will not be twisted before it is sheared. At intervals, rotation of the bushing may be reversed if desired.

Figure 5:
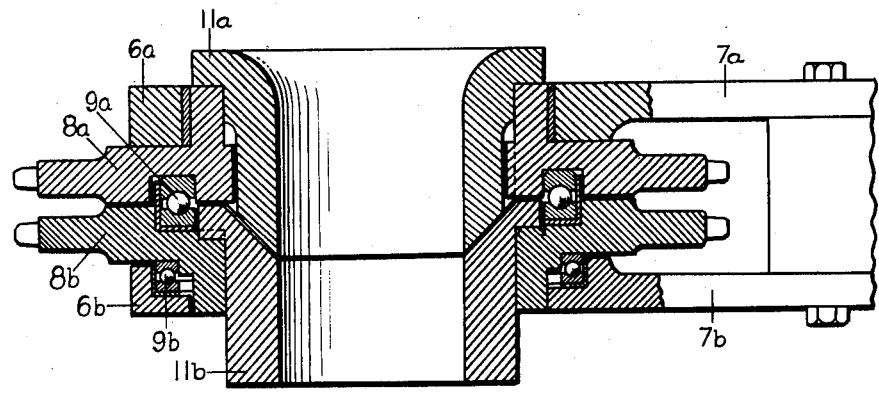
Figure 5 is a vertical sectional view showing a modified form of rotatable bushing structure.
Figure 6:
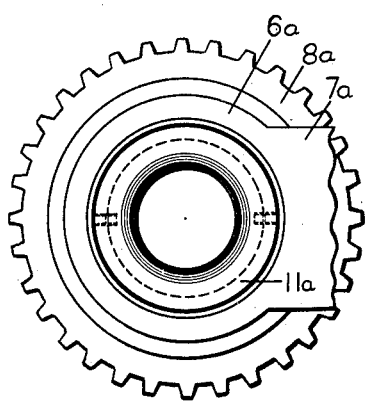
Figure 6 is a plan view of the structure shown in Figure 5.

Figures 5 and 6 illustrate a modified form of rotatable form of bushing structure which I may provide. In this form the bushing proper consists of separate interfitting sections 11a and 11b. The section 11a is supported by a sprocket 8a which has a portion fitting into a ring 6a formed on a supporting arm 7a. The portion 11a will rotate with the sprocket 8a. The portion 11b is carried by a sprocket 8b for rotation therewith. The sprocket 8b is carried by a ring 6b formed on the outer end of an arm 7b. A ball bearing 9a is provided between the two sprockets and a ball-bearing 9b provided between sprocket 8b and ring 6b. In the use of this device, the sprocket 8a is rotated in one direction while the sprocket 8b is rotated in the opposite direction. This will produce opposite rotation of the sections 11a and 11b of the bushing. This device will function substantially the same as that previously described with the exception that the two sections of the bushing will act on the glass in opposite directions.

In association with the bushing structure, I provide means for applying a lubricating and protecting film to the outer surface of the glass. I preferably apply a carbonaceous film to the glass surface although it may be of a cellulose nature or of other substance which will bond with the surface of the glass. This film may be applied to the glass either before its passage through the bushing or after its passage therethrough or at both times. As shown in the drawings the means for applying this film comprises nozzles 28 disposed above the bushing structure and on opposite sides the stream of molten glass. These nozzles may be connected to oil lines which will supply a small amount of oil or other hydrocarbon fuel. When the oil contacts with the hot glass a film of carbon will be formed on the outer surface of the glass. The carbonaceous film will serve as a lubricant and a protecting film. When the film is applied to the glass before it passes through the bushing, during the passage of the glass through the bushing the film will be worked into the glass. An annular nozzle or spraying device 29 may be disposed below the bushing structure. This will apply a carbonaceous film to the glass as it leaves the bushing.

It will be apparent from the above description that I have provided a method of feeding molten glass having many advantages. During the passage of the glass from the spout to the mold, the glass will be acted upon in such a manner that there will be a rearrangement of the fibers or molecules thereof and consequently certain strains will be eliminated from the finished article. Furthermore, the lubricating and protecting film will be applied to the glass which will facilitate entrance of the gob into the mold and will protect the finished article during inspection and packing.

Various other objects and advantages will be apparent from the preceding, and the drawings.

Having thus described my invention, what I claim is:

The method of feeding molten glass and forming separate preformed mold charges therefrom which comprises causing the glass to issue downwardly through a discharge orifice of a spout in the form of a molten stream of substantially solid cross-section and of a predetermined cross-sectional size suitable for forming mold charges of predetermined cross-section, causing the glass stream while it is still connected to the main body of glass in the spout to enter into a continuously rotating annular member disposed below the discharge orifice of the spout which is of slightly less diameter than the diameter of said stream so that it will contact the surface of the lower portion of the glass stream and serve to compact the glass of the stream, and thereafter severing a mold charge from the stream at a point above said rotating annular member to permit the mold charge to gradually settle down through said member and drop therefrom into a receiving mold.

GEORGE T. MEYERS.